US009365136B2

(12) United States Patent
Strmiska et al.

(10) Patent No.: US 9,365,136 B2
(45) Date of Patent: Jun. 14, 2016

(54) INSERT FOR A CHILD'S SEAT

(71) Applicants: Jason Jerome Strmiska, Chicago, IL (US); Stuart Nemerov, Chicago, IL (US)

(72) Inventors: Jason Jerome Strmiska, Chicago, IL (US); Stuart Nemerov, Chicago, IL (US)

(73) Assignee: THE BIRD AND BEAR GROUP LLC, Chicago, IL (US)

( * ) Notice: Subject to any disclaimer, the term of this patent is extended or adjusted under 35 U.S.C. 154(b) by 0 days.

(21) Appl. No.: 14/668,246

(22) Filed: Mar. 25, 2015

(65) Prior Publication Data

US 2015/0274040 A1      Oct. 1, 2015

Related U.S. Application Data

(60) Provisional application No. 61/970,745, filed on Mar. 26, 2014.

(51) Int. Cl.
| *A47C 31/12* | (2006.01) |
| *A47C 7/72* | (2006.01) |
| *B60N 2/28* | (2006.01) |
| *B60N 2/56* | (2006.01) |
| *B60N 2/60* | (2006.01) |

(52) U.S. Cl.
CPC ............ *B60N 2/2881* (2013.01); *B60N 2/2851* (2013.01); *B60N 2/5678* (2013.01); *B60N 2/60* (2013.01)

(58) Field of Classification Search
CPC .. B60N 2/2881; B60N 2/2851; B60N 2/5678; B60N 2/60
USPC .............. 297/219.12, 181, 393, 217.3, 217.4, 297/220
See application file for complete search history.

(56) References Cited

U.S. PATENT DOCUMENTS

| 3,840,916 | A | * | 10/1974 | Jennings | A47C 4/54 297/181 |
| 4,383,713 | A | * | 5/1983 | Roston | A47D 15/003 297/219.12 |
| 4,586,747 | A | * | 5/1986 | Taylor | A47D 1/004 297/181 |
| 4,695,092 | A | * | 9/1987 | Hittie | B60N 2/60 297/181 |
| D294,099 | S | * | 2/1988 | Bromberg | 297/181 |
| 4,775,183 | A | * | 10/1988 | Tsuge | B60N 2/28 297/219.12 |
| 4,909,573 | A | * | 3/1990 | Barry | A47D 15/006 291/181 |
| 4,984,849 | A | * | 1/1991 | Rist | B60N 2/2881 297/181 |
| 5,137,335 | A | * | 8/1992 | Marten | B60N 2/2881 297/181 |
| 5,309,586 | A | * | 5/1994 | Sies | A47D 9/02 297/219.12 X |

(Continued)

FOREIGN PATENT DOCUMENTS

DE          2342188 A1 *  9/1977  ........... B60N 2/2812

*Primary Examiner* — Rodney B White
(74) *Attorney, Agent, or Firm* — Justin Lampel

(57) ABSTRACT

An insert for the seat of a child is provided. The insert has detachable elements which may be selectively added or changed depending on the size of the child. The insert has a head rest having a removable interior hollow sound channel or a two way traditional speaker system. The head rest has an internal Bluetooth, a micro SD/TF slot and/or an audio port which may connect to an external mp3 player. A plurality of parallel slits through the main body section of the insert allows harness hardware of a child's car seat (or other seat) to be inserted through the main body section of the insert at various locations; therein allowing the insert to be used in connection with various car seats.

16 Claims, 6 Drawing Sheets

(56) References Cited

U.S. PATENT DOCUMENTS

| | | | | |
|---|---|---|---|---|
| 5,354,118 A | * | 10/1994 | Barry | A47D 1/02 297/181 |
| 5,482,352 A | * | 1/1996 | Leal | B60N 2/28 297/219.12 X |
| 5,624,156 A | * | 4/1997 | Leal | A47C 7/72 297/219.12 X |
| 5,941,599 A | * | 8/1999 | Roberts | A47C 3/16 297/181 X |
| 5,988,752 A | * | 11/1999 | Richards | B60N 2/2851 297/181 |
| 6,126,240 A | * | 10/2000 | Tse | A47D 7/383 297/181 |
| 6,139,100 A | * | 10/2000 | Baskin-Lockman | B60N 2/2851 297/219.12 |
| 6,216,298 B1 | * | 4/2001 | Oliveira | A47C 7/383 297/393 |
| 6,266,832 B1 | * | 7/2001 | Ezell | A47G 9/10 297/219.12 |
| 6,494,532 B1 | * | 12/2002 | Brosnan | A47C 3/16 297/181 |
| 6,523,901 B2 | * | 2/2003 | Smith | B60N 2/2806 297/219.12 |
| 7,029,066 B1 | * | 4/2006 | Myers-Jones | B62B 3/144 297/219.12 X |
| 7,530,634 B1 | * | 5/2009 | Mortazavi | A47C 7/383 297/219.12 X |
| 7,537,284 B1 | * | 5/2009 | Antorcha | B60N 2/2881 297/219.12 |
| 7,588,291 B2 | * | 9/2009 | Gold | A47D 5/00 297/219.12 |
| 7,740,313 B1 | * | 6/2010 | Hei | B60N 2/2806 297/219.12 X |
| 7,854,476 B1 | * | 12/2010 | Liu | A47D 1/103 297/181 |
| 8,016,676 B2 | * | 9/2011 | Carter | B60N 2/2839 297/219.12 |
| 8,240,772 B2 | * | 8/2012 | Kawata | B60N 2/2812 297/219.12 |
| 8,246,115 B1 | * | 8/2012 | Loyer | A47D 1/103 297/181 |
| 8,544,949 B2 | * | 10/2013 | Taton | A47D 13/107 297/219.12 X |
| 8,758,135 B2 | * | 6/2014 | Carter | B60N 2/28 297/219.12 |
| 8,770,663 B2 | * | 7/2014 | Zack | A47C 31/11 297/181 |
| 2004/0017100 A1 | * | 1/2004 | Gold | A47D 15/006 297/219.12 |
| 2004/0239163 A1 | * | 12/2004 | Runk | B60N 2/26 291/219.12 |
| 2007/0132290 A1 | * | 6/2007 | Moshopoulos | A47C 7/386 297/181 X |
| 2008/0073954 A1 | * | 3/2008 | Paulson | B60N 2/28 297/219.12 |
| 2011/0163520 A1 | * | 7/2011 | Fair | A63H 33/006 297/219.12 X |
| 2012/0187732 A1 | * | 7/2012 | Lerm | A47C 7/744 297/219.12 |

* cited by examiner

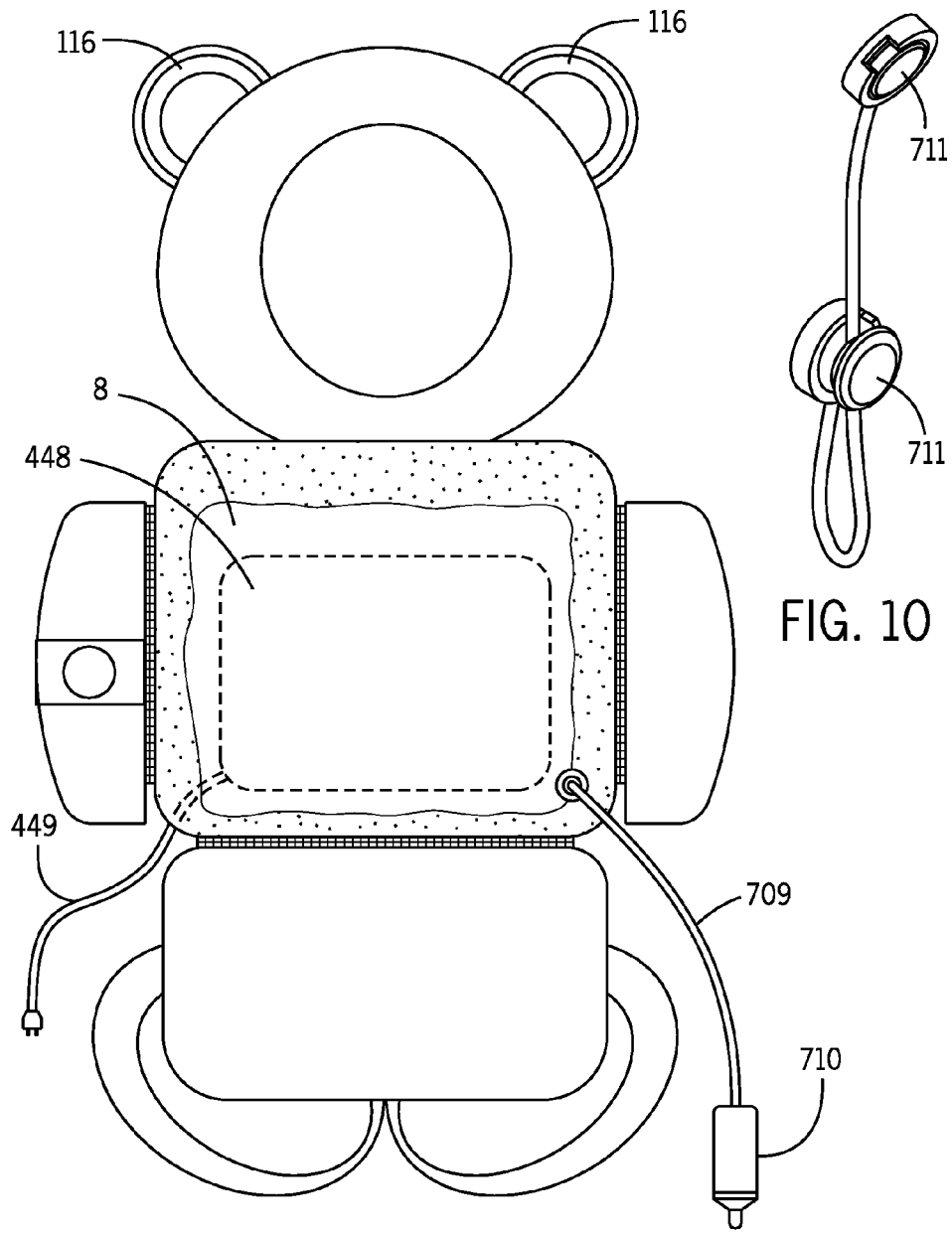

INSERT FOR A CHILD'S SEAT

CROSS REFERENCE TO RELATED APPLICATIONS

The following application is based on and claims the priority benefit of U.S. provisional application Ser. No. 61/970,745 filed Mar. 26, 2014; the entire contents of which are incorporated by reference.

BACKGROUND OF THE INVENTION

An insert for the seat of a child is provided. The insert has detachable elements which may be selectively added or changed depending on the size of the child. The insert has a head rest having a removable interior hollow sound channel and/or a two way traditional speaker system. The head rest has an internal Bluetooth, a micro SD/TF slot and/or an audio port which may connect to an external mp3 player. The internal Bluetooth, a micro SD/TF slot and/or an audio port which may connect to an external mp3 player may play music, educational material or a prerecorded message from a friend or relative. A plurality of parallel slits through the main body section of the insert allows harness hardware of a child's car seat (or other seat) to be inserted through the main body section of the insert at various locations; therein allowing the insert to be used in connection with various car seats. A fixed and/or inflatable bolster system may further prevent the child from accidentally rolling off the main body section of the device.

Over the years, attempts have been made to provide a child seat insert which is easy to use and efficient. For example, U.S. Pat. No. 8,556,343 to Rubinshteyn discloses a seat liner having a cushion within the seat liner, the cushion includes a body of memory foam and a soft, flexible, and washable material located upon said body of memory foam. In a preferred embodiment, the seat liner may be folded into a folded position, or it may be rolled into a rolled position in order to ensure maximum portability. Further, said seat liner may also include one or more means for attaching various accessories, such as toys, bottles, blankets, and pacifiers.

Further, U.S. Pat. No. 7,222,917 to Ward discloses a juvenile seat unit having a seat and a reversible seat pad for the seat. Belt-receiving slots are formed in the reversible seat pad to receive belts coupled to the seat.

Still further, U.S. Pat. No. 6,428,098 to Allbaugh discloses a one-piece, flexible liner for a high chair or other type of child seat having: a) a central, generally square-shaped seat portion; b) a pair of arm portions extending from opposite sides of the seat portion; c) a front portion extending from a third side of the seat portion; d) a generally rectangular-shaped back portion extending from a fourth side of the seat portion opposite to the front portion; e) one or more fastening mechanisms for detachably attaching the liner to the high chair or child seat; and f) a storage pouch, which is a part of the liner, for holding the folded liner. The present invention also encompasses a disposable seat liner which includes: (a) an upper layer of flexible, liquid-permeable sheet material; (b) a middle layer of an absorbent core material; (c) a lower layer of liquid impermeable material, and (d) a detachable adhesive on the lower layer for contacting the chair seat. A method for folding a one-piece liner into an attached storage pouch is also included herein.

However, these patents fail to describe an insert for a child's seat which is easy to use and efficient. Further, these patents fail to provide an insert for a child's seat which has detachable elements and which has a built-in speaker system.

SUMMARY OF THE INVENTION

An insert for the seat of a child is provided. The insert has detachable elements which may be selectively added or changed depending on the size of the child. The insert has a head rest having a removable interior hollow sound channel and/or a two way traditional speaker system. The head rest has an internal Bluetooth, a micro SD/TF slot and/or an audio port which may connect to an external mp3 player. The internal Bluetooth, a micro SD/TF slot and/or an audio port which may connect to an external mp3 player may play music, educational material or a prerecorded message from a friend or relative. A plurality of parallel slits through the main body section of the insert allows harness hardware of a child's car seat (or other seat) to be inserted through the main body section of the insert at various locations; therein allowing the insert to be used in connection with various car seats. A fixed and/or inflatable bolster system may further prevent the child from accidentally rolling off the main body section of the device.

An advantage of the present insert for a child's seat is that the present insert may be machine washed as a single unit.

Yet another advantage of the present insert for a child's seat is that the present insert may have a plurality of slits which allows the insert to be used in connection with harness hardware of variously sized children's car seats and/or account for a child's growth.

Still another advantage of the present insert for a child's seat is that the present insert may have a generally hollow removable sound tube for directing music, educational content or prerecorded messages from a relative or friend to the child.

And yet another advantage of the present insert for a child's seat is that the present insert may have detachable elements which may be selectively attached to a main body section depending on the size of the child.

In an embodiment, an advantage of the present insert for a child's seat is that the present insert may have ears angled at approximately a thirty-five to fifty-five degree angle so as to better direct sound exiting the ears of the insert toward the child.

Still another advantage of the present insert for a child's seat is that the present insert helps keep a seat, for example a car seat, clean and free from stains.

And an advantage of the present insert for a child's seat is that the present device may have, in an embodiment, an internal heating element and/or massage element.

Still another advantage of the present insert for a child's seat is that the present device may have, in an embodiment, a tether for securing an article such as a bottle or toy.

Still another advantage of the present insert for a child's seat is that the present insert may be used standalone to accommodate a child who is resting flat, either on a stationary surface or on a parent's lap.

An advantage of the present insert for a child's seat is that the present insert may be used in connection with a car seat, highchair, stroller, bouncer, swing or various other children's seat.

Yet another advantage of the present insert for a child's seat is that the present insert may be produced in various colors, fabrics and shapes (for example, animal shapes) to help calm and comfort a child.

For a more complete understanding of the above listed features and advantages of the insert for a child seat, reference

BRIEF DESCRIPTION OF THE DRAWINGS

FIG. 8 illustrates a view of the bottom surface of an alternative embodiment of the insert for a child's seat wherein the insert has an internal heating element, massage element and a tether for securing an article.

FIG. 9 illustrates a cross-sectional view of an embodiment of the device illustrating the elevated frame bolster system.

FIG. 10 illustrates a detailed view of the tether system of the child seat insert.

DETAILED DESCRIPTION OF THE PREFERRED EMBODIMENTS

An insert for the seat of a child is provided. The insert has detachable elements which may be selectively added or changed depending on the size of the child. The insert has a head rest having a removable interior hollow sound channel and/or a two way traditional speaker system. The head rest has an internal Bluetooth, a micro SD/TF slot and/or an audio port which may connect to an external mp3 player. The internal Bluetooth, a micro SD/TF slot and/or an audio port which may connect to an external mp3 player may play music, educational material or a prerecorded message from a friend or relative. A plurality of parallel slits through the main body section of the insert allows harness hardware of a child's car seat (or other seat) to be inserted through the main body section of the insert at various locations; therein allowing the insert to be used in connection with various car seats. A fixed and/or inflatable bolster system may further prevent the child from accidentally rolling off the main body section of the device.

Figure 1:
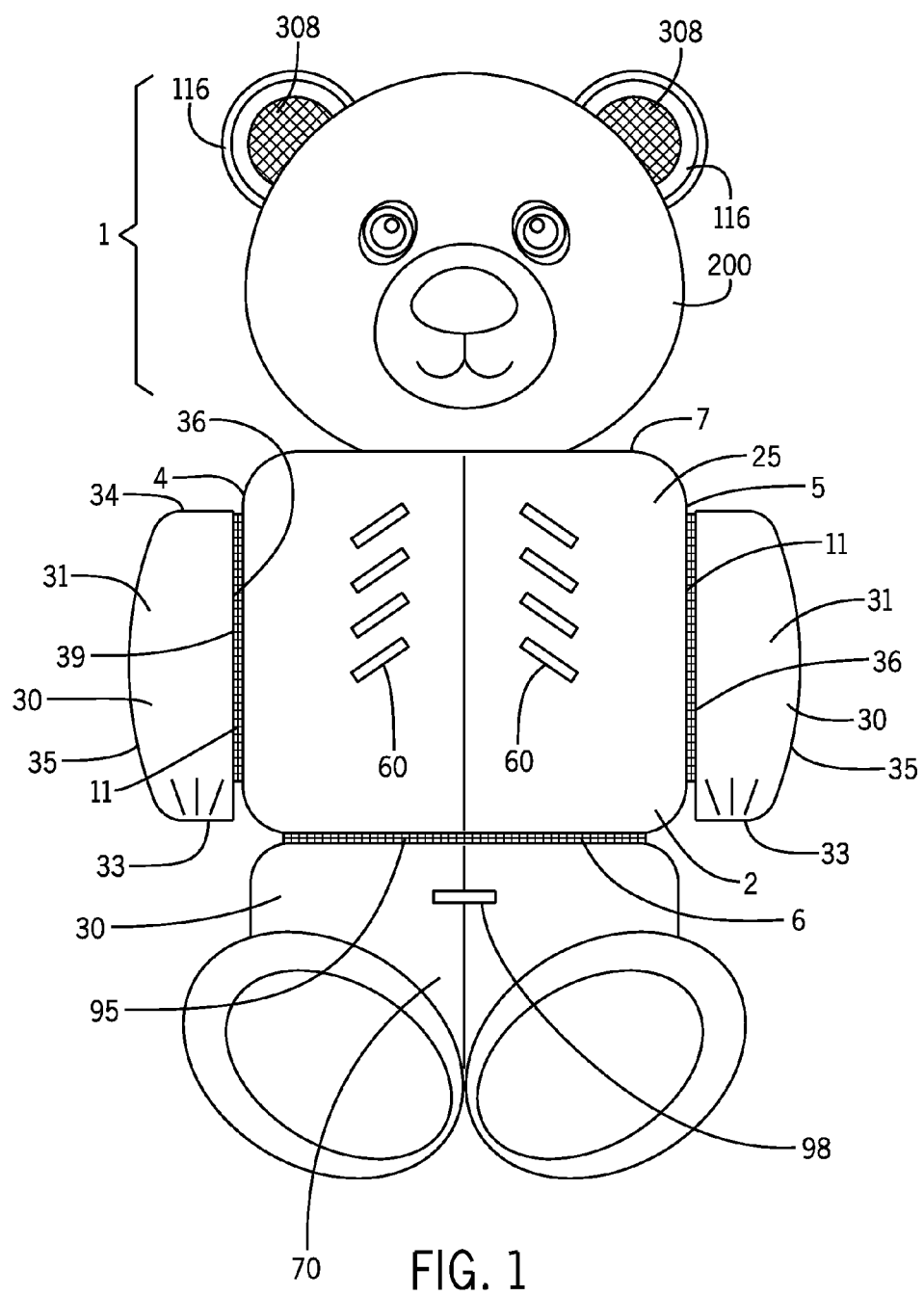
FIG. 1 illustrates a plan view of the top surface of the insert for a child's seat.
Figure 2:
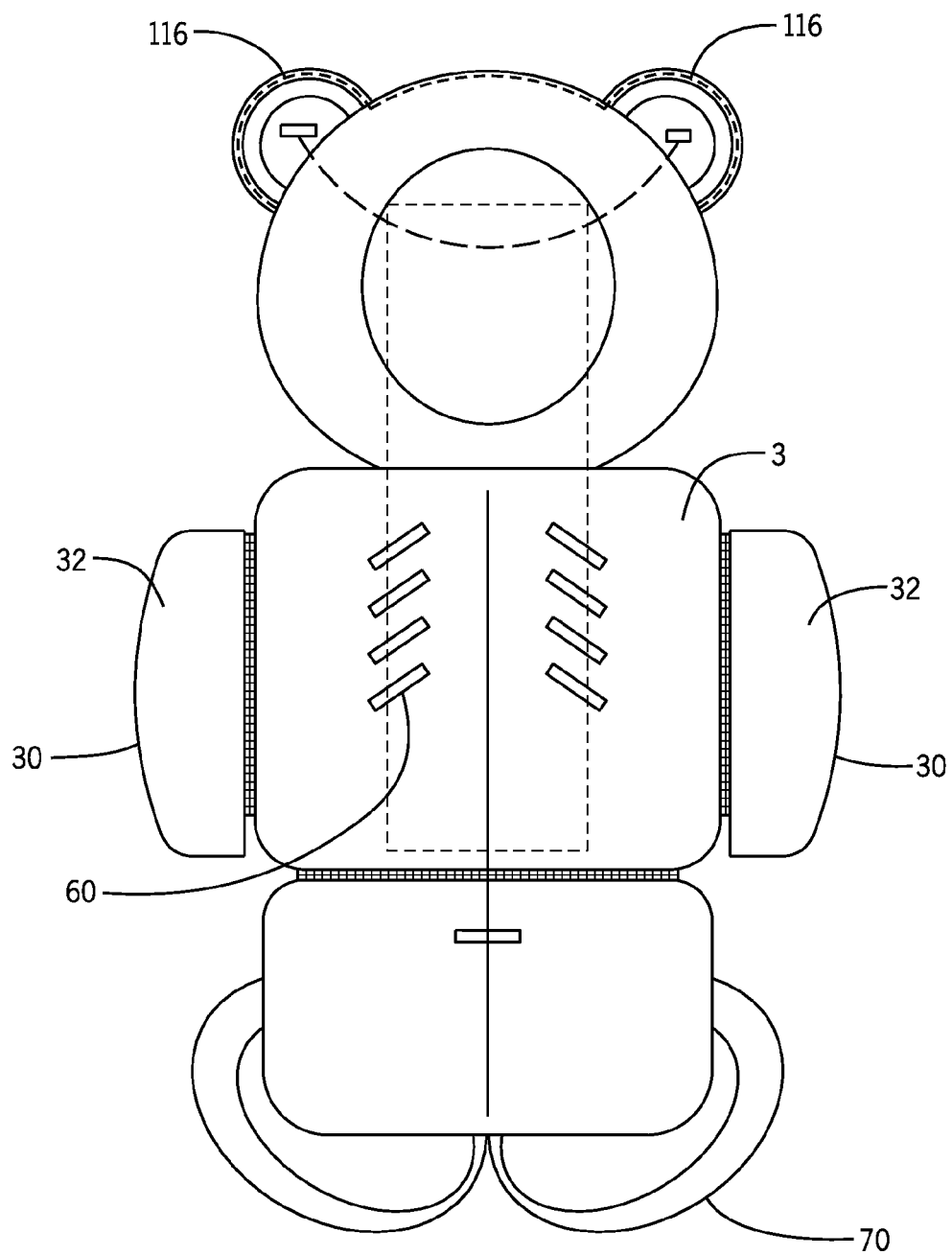
FIG. 2 illustrates a plan view of the bottom surface of the insert for a child's seat.
Figure 3:
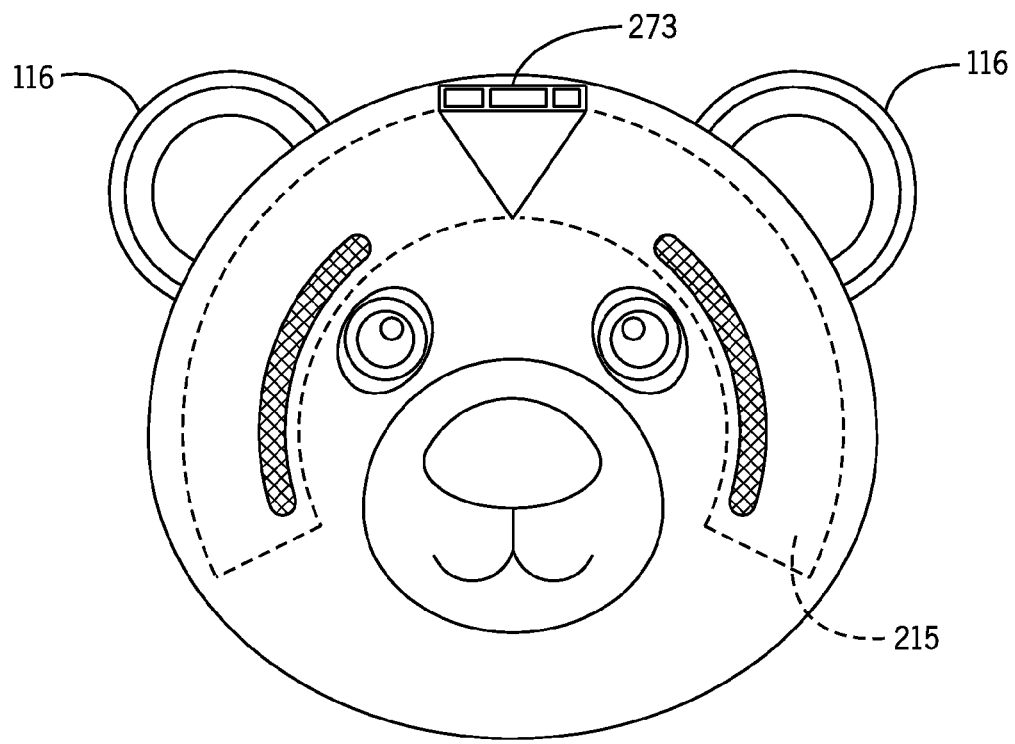
FIG. 3 illustrates a plan view of the top surface of the head portion of the insert for a child's seat.
Figure 4:
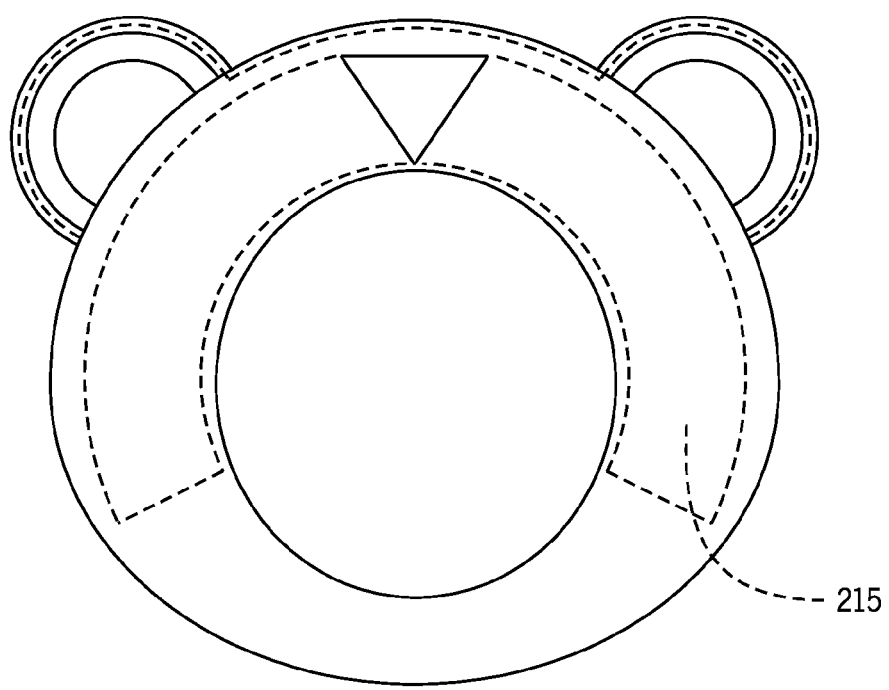
FIG. 4 illustrates a plan view of the bottom surface of the head portion of the insert for a child's seat.

Referring now to FIG. 1, an insert 1 for a child's seat 50 (FIG. 6) is provided. The insert 1 may have a main body section 25 having a top surface 2, a bottom surface 3 (FIG. 2), a first side 4, a second side 5, a front 6, a back 7 and an interior 8 (FIG. 8). Preferably, the insert 1 is largely made of a soft cloth or textile which is machine washable.

In an embodiment, the main body section 25 of the insert 1 is generally square in shape (although various other shapes may be utilized). A securing mechanism 11 may be located on the first side 4 and the second side 5 of the main body section 25. In an embodiment, the securing mechanism 11 is a hook and loop fastener, a button system, a magnet system, a Zipper or the like. Preferably, the securing mechanism 11 on the first side 4 and the second side 5 of the main body section 25 may run parallel to each other and may run substantially the entire length of the first side 4 and the second side 5 of the main body section 25.

In an embodiment, a plurality of detachable side sections 30 may be used in connection with the device 1. More specifically, the detachable side sections 30 may be temporarily and selectively secured to the securing mechanism 11 of the first side 4 and the second side 5 of the main body section 25. The size of the detachable side sections 30 utilized may be selectively changed for larger or smaller detachable side sections 30 depending on the size of the child 90. In an embodiment, the detachable side sections 30 may have a top surface 31, a bottom surface 32 (FIG. 2), a front 33, a back 34, a first side 35, a second side 36 and an interior (not shown). The second side 36 of each of the detachable side sections 30 may have a corresponding securing mechanism 39 (FIG. 7) which removably secures to the securing mechanism 11 of the main body section 25. As a result, a user may selectively secure and or remove the detachable side sections 30 from the main body section 25 to, for example, wash, replace or switch for an alternative size detachable side section 30. Further, in an embodiment, the device 1 may be used without the detachable side sections 30 so that the main body section 25 is the distal most point on the sides of the device 1.

In an embodiment, the detachable side sections 30 may resemble, for example, the arms of an animal. The figures illustrate the device 1 formed in the shape of a bear, however the device 1 may be of any shape and size. Further, the device 1 may be constructed from various textiles and colors.

In an embodiment, a plurality of slits 60 may be present on the top surface 2 of the main body section 25 of the insert 1. Preferably, the plurality of slits 60 of the insert 1 run parallel to each other and at approximately a thirty-five to fifty-five degree angle with respect to the front 6 of the main body section 25. In an alternative embodiment, the plurality of slits 60 runs substantially the entire length (not shown) of the main body section 25. The plurality of slits 60 may provide an opening which extends through from the top surface 2 to the bottom surface 3 of the main body section 25. The plurality of sits 60 may allow harness hardware 100 (FIG. 6) to be inserted through the middle portion of the main body section 25. The harness hardware 100 may be, for example, a five-point car seat restraining device. As a result, the insert 1 may be placed over a car seat 50 and may keep the car seat 50 clean. The extended length of the plurality of slits 60 also allows the device 1 to be used in connection with harness hardware 100 of various sizes and shapes as the harness hardware 100 may be shifted slightly up or down within the plurality of slits 60 to optimal comfort and safety.

Figure 6:
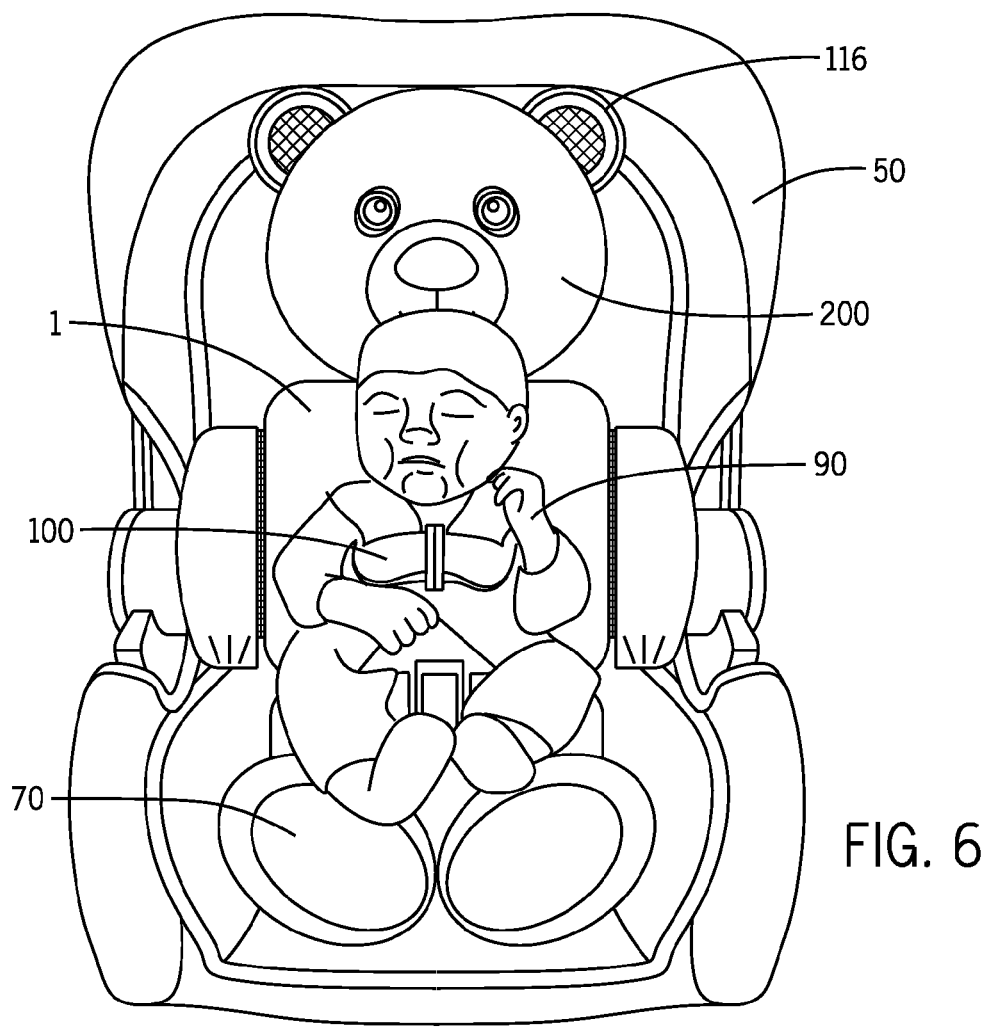
FIG. 6 illustrates a view of the insert for a child's seat wherein a child is located on the insert and the insert and the child are positioned in a car seat.

Located at the front 6 of the main body section 25 may be a foot section 70. In use, the foot section 70 may be used under the feet of a child 90 (FIG. 6). In an embodiment, the foot section 70 is detachable from the main body section 25 in a manner similar to the detachable side sections 30. In particular, the foot section 70 may be removed from the main body section 25 by utilizing a securing mechanism 95 located between the foot section 70 and the main body section 25. The foot section 70 may further have a slit 98 for receiving harness hardware 100 similar to the skits 60 of the main body section 25.

In an alternative embodiment, a flap 125 having a securing mechanism (FIG. 7), such as a hook and loop fastener system, may be located along the plurality of slits 60. The flap 125 of the plurality of slits 60 may be connected to the main body 25 on one side of the flap 125 and loose on the opposing side of the flap 125. The flap 125 may allow the harness hardware 100 to be properly positioned through the slits 60 and then secured into place by a securing mechanism on the flap 125 thus preventing the device 1 from moving with respect to the harness hardware 100. More specifically, the flap 125 having the securing mechanism may secure the areas around the harness hardware 100 so as to avoid shifting of the insert 1.

Figure 7:
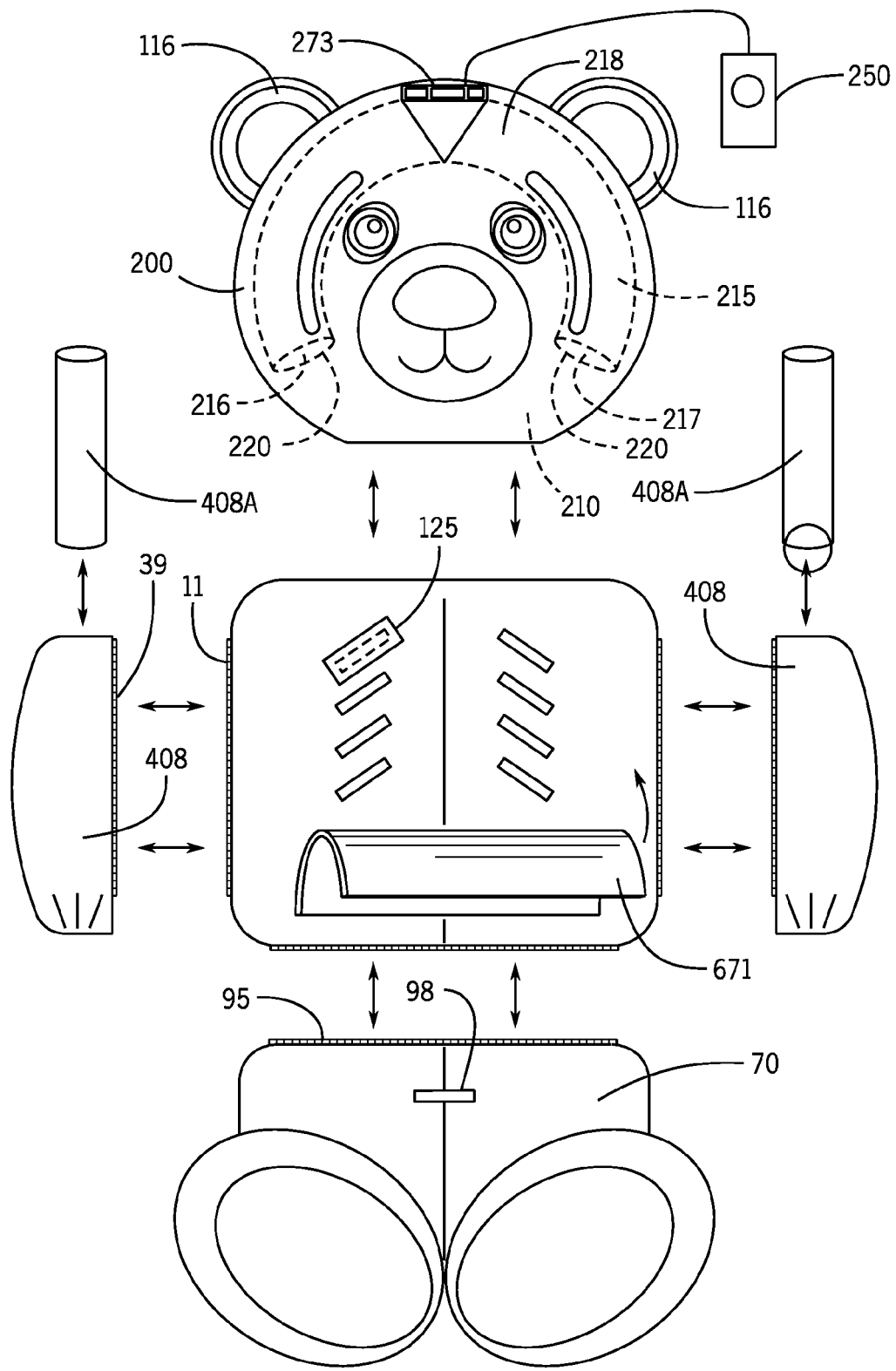
FIG. 7 illustrates a view of the top surface of an alternative embodiment of the insert for a child's seat wherein portions of the insert are illustrated removed from the main body section of the insert.

Referring now to FIG. 7, in an embodiment, a head section 200 may be secured to the back 7 of the main body section 25. The head section 200 may be generally padded for additional comfort. The head section 200 may have an interior 210. Located within the interior 210 of the head section 200 may be a removable sound tube 215. The removable sound tube 215 may have a first end 216, a second end 217 and a generally hollow interior 218 for directing the flow of sound waves. In an embodiment, the removable sound tube 215 is preferably made of a lightly flexible plastic so as to increase comfort when the head of a child 90 is positioned against the head section 200, but no too flexible as to allow the removable sound tube 215 to completely collapse.

In an embodiment, the first end 216 of the removable sound tube 215 may be located in the interior 210 of the head section 200 at approximately the location wherein the right ear of the child 90 would be positioned when the child 90 is resting on the device 1. In an embodiment, the second end 217 of the removable sound tube 215 may be at the approximate location wherein the left ear of the child 90 would be positioned when the child 90 is resting on the device 1. The first end 216 and the second end 217 of the removable sound tube 215 may have an opening 220. The opening 220 at the first end 216 and the second end 217 of the removable sound tube 215 may be where speakers of the device 1 are located. Alternatively, speakers may be located elsewhere in the head portion 200 and the sound merely redirected to the openings 220 of the sound tube 215. The removable sound tube 215 may be electrically connected to an internal Bluetooth, a micro SD/TF slot and/or an audio port 273 which may connect to an external mp3 player 250. In an alternative embodiment, the internal Bluetooth, a micro SD/TF slot and/or an audio port which may connect to an external mp3 player 250 is located within the interior of the head section 200 and preprogrammed with music (embodiment not shown). An on/off switch may be located on, for example, an ear of the head section 200. Further, in addition to music, a user may play educational information or a personalized recording for the child through the device 1.

Figure 5:
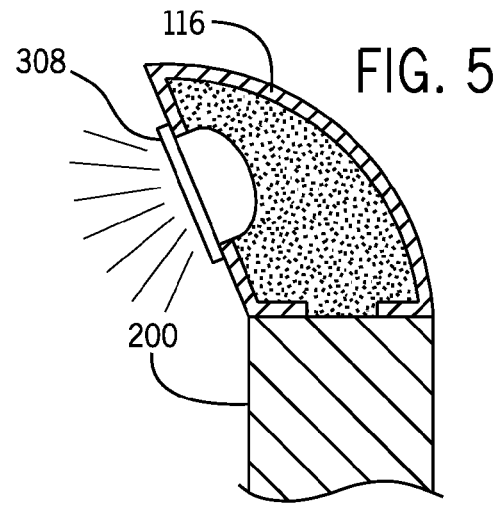
FIG. 5 illustrates an alternative embodiment of the head portion of the insert for a child's seat wherein the ear portion of the insert is angled toward the child to increase the sound delivery to the child.

In an alternative embodiment to the removable sound tube 215, a traditional two speaker system 308 (FIG. 1) may be incorporated into the device 1 within the head section 200. In this embodiment, the Bluetooth, mp3 player or the like may be electrically connected to the speaker system 308 of the device 1. Referring to FIG. 5, in this embodiment, the ear portion 116 of the insert 1 may be located upward at approximately a thirty-five to fifty-five degree angle with respect to the main portion of the head section 200. Angling the ears 116 and speaker system 308 may allow the device 1 to better direct the sound exiting the speak system 308 to the child 90.

Referring now to FIG. 7, in an alternative embodiment, the device 1 may utilize a bolster system 408. More specifically, within the interior (not shown) of the plurality of detachable side sections 30 or, in an embodiment, the detachable side sections 30 themselves may be an elevated frame bolster system 408. In particular, the detachable side sections 30 may have a thickness greater than the thickness of the main body section 25, as illustrated in FIG. 9. In particular, the thickness of the detachable side sections 30 is at least twice as great as the thickness of the main body section 25. The elevated frame bolster system 408 may be made from, for example, plastic, metal, foam or the like and may slightly elevate the sides of the device 1 with respect to the main body section 25 of the device 1. Further, in an embodiment, the elevated frame bolster system 408 may be inflatable during use. The inflatable nature of the bolster system 408 may allow the bolster system 408 to be deflated for storage or transportation.

Preferably, the elevated frame bolster system 408 is padded so as to provide additional comfort and reduce possible injuries. When the device 1 is placed on, for example, a table, couch or the like, the main body section 25 may touch and may be flush with the table or couch while the detachable side sections 30 may be slightly elevated off the table, couch or the like (see FIG. 9). As a result, if the child 90 rolls to the side of the main body section 25, the child 90 will be prevented from rolling off the main body section 25 and prevented from falling off the table, couch or the like and causing injury to him/herself. In an alternative embodiment, FIG. 7, inserts 408A may be temporarily removed from the interior (not shown) of the bolster system 408 so that the detachable side sections 30 may be washed.

In addition to the elevated frame bolster system 408 being located at the first side 4 and the second side 5 of the main body section 25, the elevated frame bolster system 408 may also be located within the foot section 70. As a result, when the device 1 is placed on a flat surface, the child 90 will remain secure in a shell-like environment.

Referring now to FIGS. 8 and 10, in an alternative embodiment, the main body section 25 of the device 1 may support a tether 709 that attaches onto a solid round convex-shaped disk 711, constructed of plastic, rubber, latex, vinyl, fabric or the like. The solid round convex-shaped disk 711 may be elevated and may be secured to the main body section 25 and or to the child's seat 50 via an adhesive. In an embodiment, the tether 709 may be constructed of beaded plastic, rubber, latex, vinyl, fabric or the like, and may be used to temporarily secure an interchangeable item 710 such as, for example, a bottle, toy of the like. The interchangeable item 710 may also have a matching solid round convex-shaped disk 711 which is secured to the surface of the interchangeable item 710 via an adhesive. The tether 709 may therein prevent the child 90 from dropping the item 710 and being unable to reach the item 710 while, for example, the parent of the child 90 is driving. Further, the tether 709 may also prevent the item 710 from contacting the ground and becoming unsanitary.

In an alternative embodiment, the loop portion of the tether 709 in FIG. 10 may be used to secure the interchangeable item 710. The tether 709 may employ at either end a thin solid round latching vehicle with an outer rim that's interior points inward, all constructed of plastic, rubber, latex, vinyl or the like. The tether 709 secures to the disk 711 by placing the latching vehicle over the disk 711 and pulling downward until the latching vehicle can hover freely over the convex shaped disk 711.

Finally, in yet an alternative embodiment, the device 1 may have a low voltage internal heating element and/or massage element 448. The low voltage internal heating element and/or massage element 448 may have a cord and plug 449 (or car plug) which allows the device 1 to be heated. In an embodiment, the device 1 may have a removable protective padded portion 671 (FIG. 7) which may be temporarily secured to the top surface 2 of the main body section 25. The removable protective padded portion 671 may reduce stains which may otherwise be located on the main body section 25 if the removable protective padded portion 671 is absent. The removable protective padded portion 671 may be a generally square-shaped device which is placed over the top surface 2 of the main body section 25.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. An insert for the seat of a child comprising:
a generally flat main body section having a top surface, a bottom surface, a front, a back, a first side and a second side;
a plurality of slits located in the main body section, the plurality of slits creating an opening passageway from the top surface to the bottom surface of the generally flat main body section, the plurality of slits receiving at least a portion of a securing harness of the seat which passes through at least one of the plurality of slits, the securing harness securing the child in the seat;
at least one removable side section secured to the first side or second side of the generally flat main body section;
the generally flat main body section is configured to be placed between the child and the seat, the generally flat main body section protecting the seat from damage;
a head rest portion secured to the back of the generally flat main body section, the head rest portion having a generally flat front surface for supporting the head of the child; and
a plurality of extended flaps creating ear portions secured to the head rest portion, each of the plurality of extended flaps having a front surface and an internal speaker located within an interior of the extended flaps, wherein the front surface of each of the extended flaps is angled upward between thirty-five and fifty-five degrees in a non-parallel orientation with respect to the front surface of the head rest portion.

2. The insert for the seat of a child of claim 1 further comprising:
wherein the plurality of slits are parallel to each other.

3. The insert for the seat of a child of claim 1 further comprising:
wherein the plurality of slits are located at a forty-five degree angle with respect to the front of the generally flat main body section.

4. The insert for the seat of a child of claim 1 wherein the removable side section has a thickness twice as great as a thickness of the main body section.

5. The insert for the seat of a child of claim 1 wherein the main body section is padded.

6. The insert for the seat of a child of claim 1 further comprising:
an electrical audio port for electrically connecting a micro SD/TF or external mp3 player to a speaker located within the head rest portion.

7. The insert for the seat of a child of claim 1 further comprising:
an electrical heating element located within an interior of the main body section wherein the electrical heating element is electrically connected to a power source and wherein the electrical heating element heats up the main body section.

8. The insert for the seat of a child of claim 1 further comprising: a tether secured to the top surface of bottom surface of the main body section wherein the tether removably and selectively secures a bottle, toy or other item.

9. The insert for a seat of a child of claim 8 wherein the tether comprises:
a solid round convex-shaped disk anchor portion and a generally flexible rope secured to the solid round convex-shaped disk.

10. The insert for a seat of a child of claim 9 wherein the solid round convex-shaped disk is secured to the main body section by an adhesive.

11. The insert for a seat of a child of claim 1 further comprising:
a removable cylindrical bolster wherein the removable cylindrical bolster is temporarily inserted within an interior of the removable side section.

12. The insert for a seat of a child of claim 1 further comprising:
a generally square-shaped second layer removably secured to the top surface of the generally flat main body section wherein the generally square-shaped second layer is padded.

13. An insert for the seat of a child comprising:
a generally flat main body section having a top surface, a bottom surface, a front, a back, a first side, a second side and head rest portion secured to the back, the head rest being configured to support the head of a child;
a plurality of slits located in the main body section, the plurality of slits creating an opening passageway from the top surface to the bottom surface of the generally flat main body section, the plurality of slits receiving at least a portion of a securing harness of the seat which passes through at least one of the plurality of slits, the securing harness securing the child in the seat;
at least one removable side section secured to the first side or second side of the generally flat main body section;
the generally flat main body section is configured to be placed between the child and the seat, the generally flat main body section protecting the seat from damage; and
a removable interior hollow sound channel located within an interior of the head rest, wherein the removable interior hollow sound channel is configured to direct sound waves toward the ears of a child.

14. The insert for the seat of a child of claim 13 wherein the removable interior hollow sound channel is flexible.

15. The insert for a seat of a child of claim 13 further comprising:
a removable cylindrical bolster wherein the removable cylindrical bolster is temporarily inserted within an interior of the removable side section.

16. The insert for a seat of a child of claim 13 further comprising:
a generally square-shaped second layer removably secured to the top surface of the generally flat main body section wherein the generally square-shaped second layer is padded.

* * * * *